June 11, 1968  M. BENTELE  3,387,595
ROTARY COMBUSTION ENGINE WITH PRECOMBUSTION CHAMBER
Filed May 1, 1962  7 Sheets-Sheet 1

INVENTOR.
MAX BENTELE
BY
William V. Eba
HIS ATTORNEY

June 11, 1968  M. BENTELE  3,387,595
ROTARY COMBUSTION ENGINE WITH PRECOMBUSTION CHAMBER
Filed May 1, 1962  7 Sheets-Sheet 2

INVENTOR.
MAX BENTELE
BY
William V. Ebs
HIS ATTORNEY

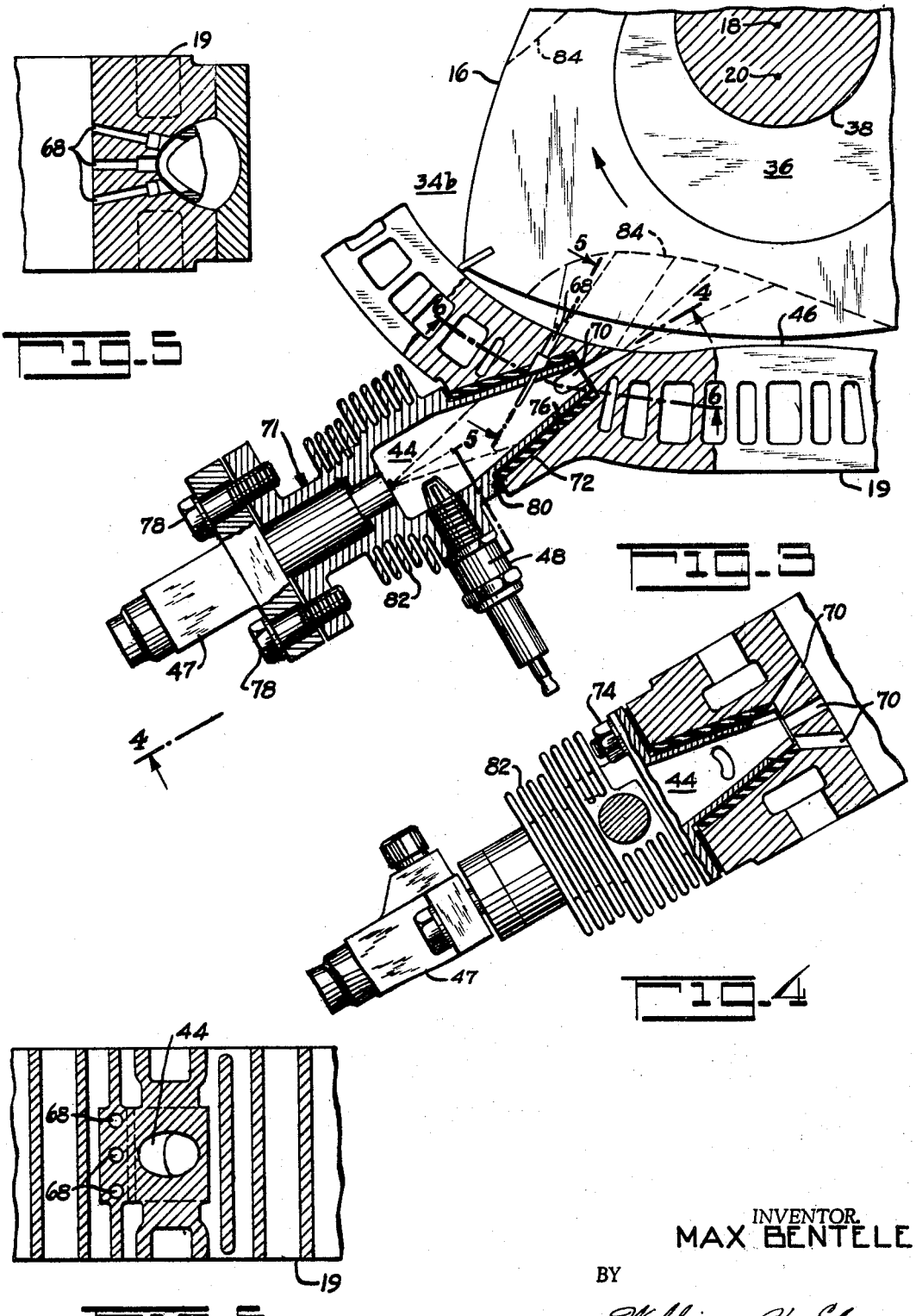

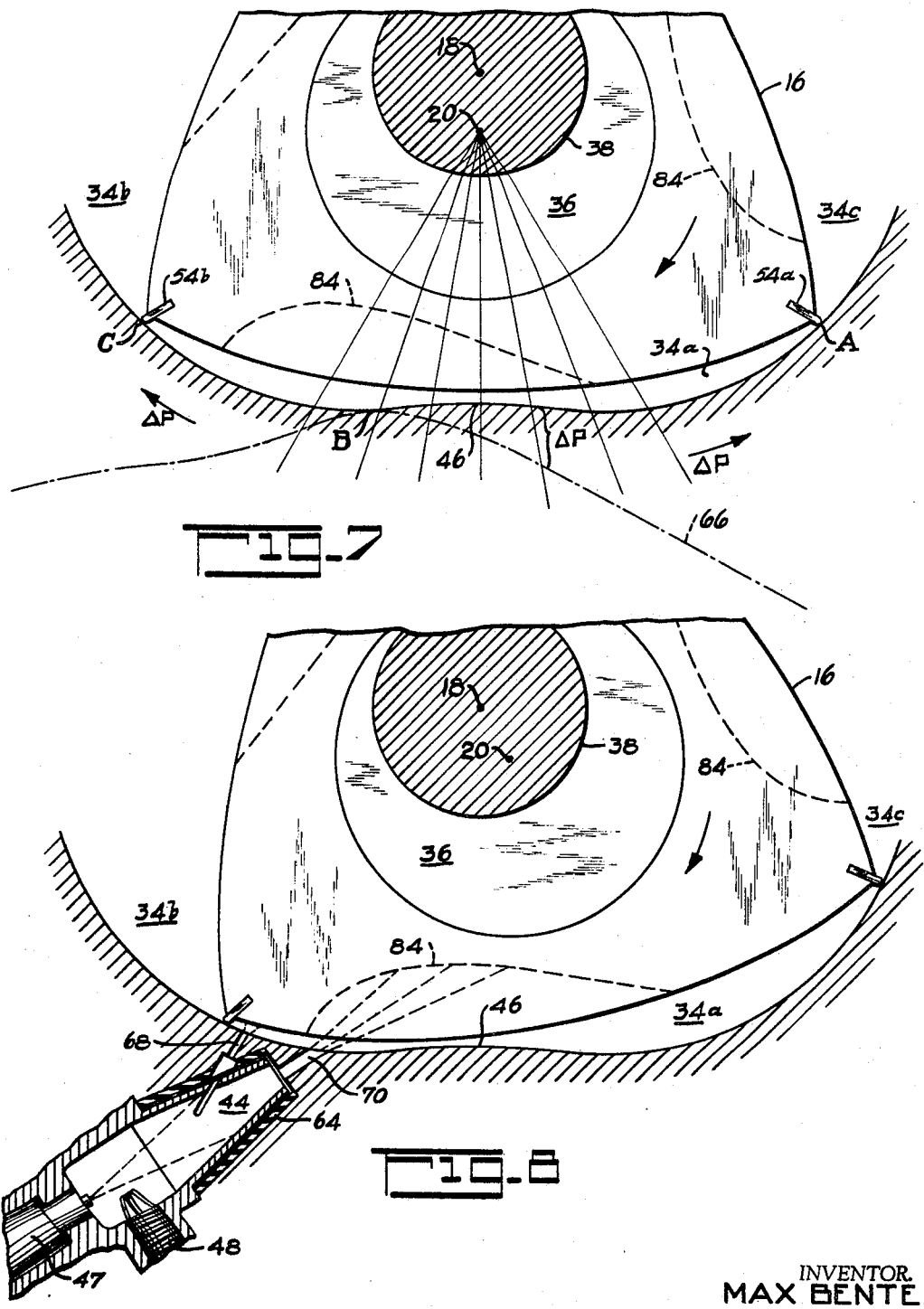

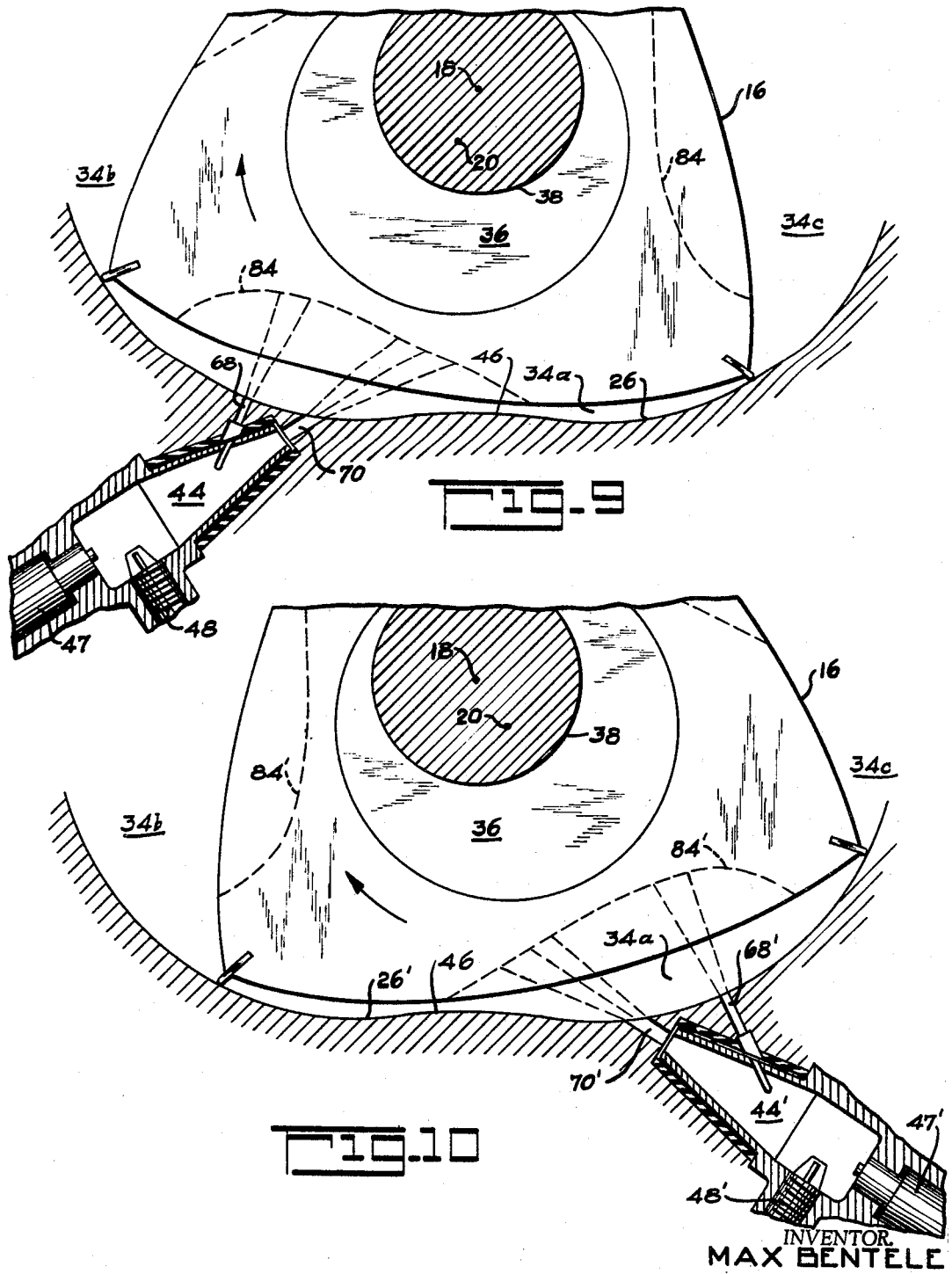

June 11, 1968     M. BENTELE     3,387,595
ROTARY COMBUSTION ENGINE WITH PRECOMBUSTION CHAMBER
Filed May 1, 1962     7 Sheets-Sheet 6
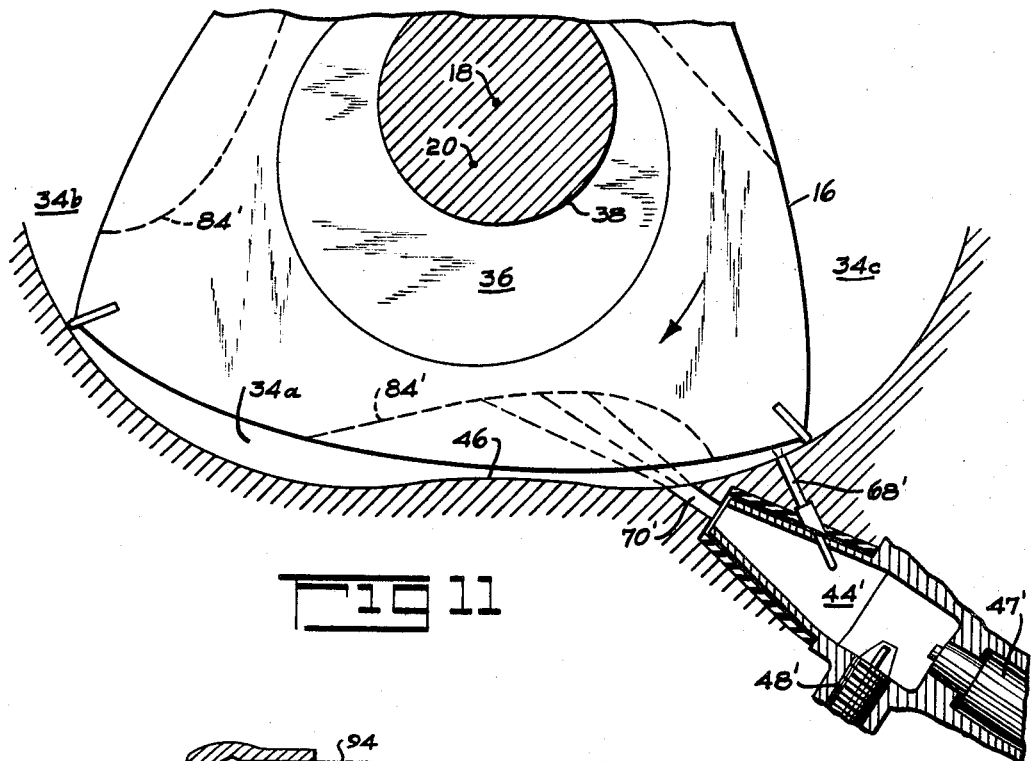
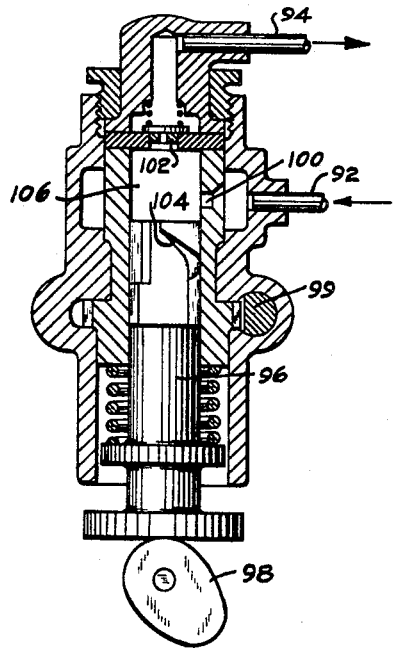
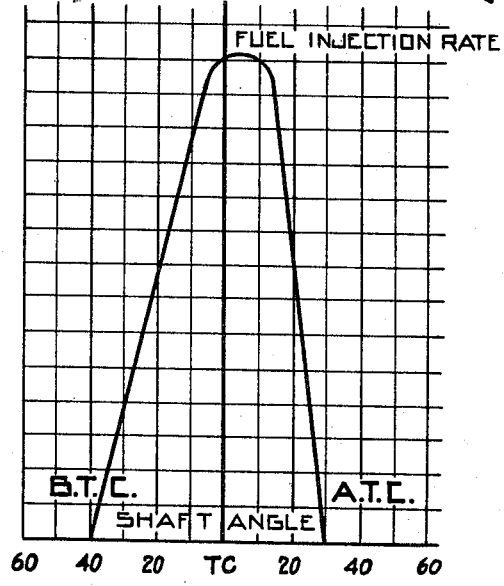
INVENTOR
MAX BENTELE
BY
William V. Ebs
HIS ATTORNEY

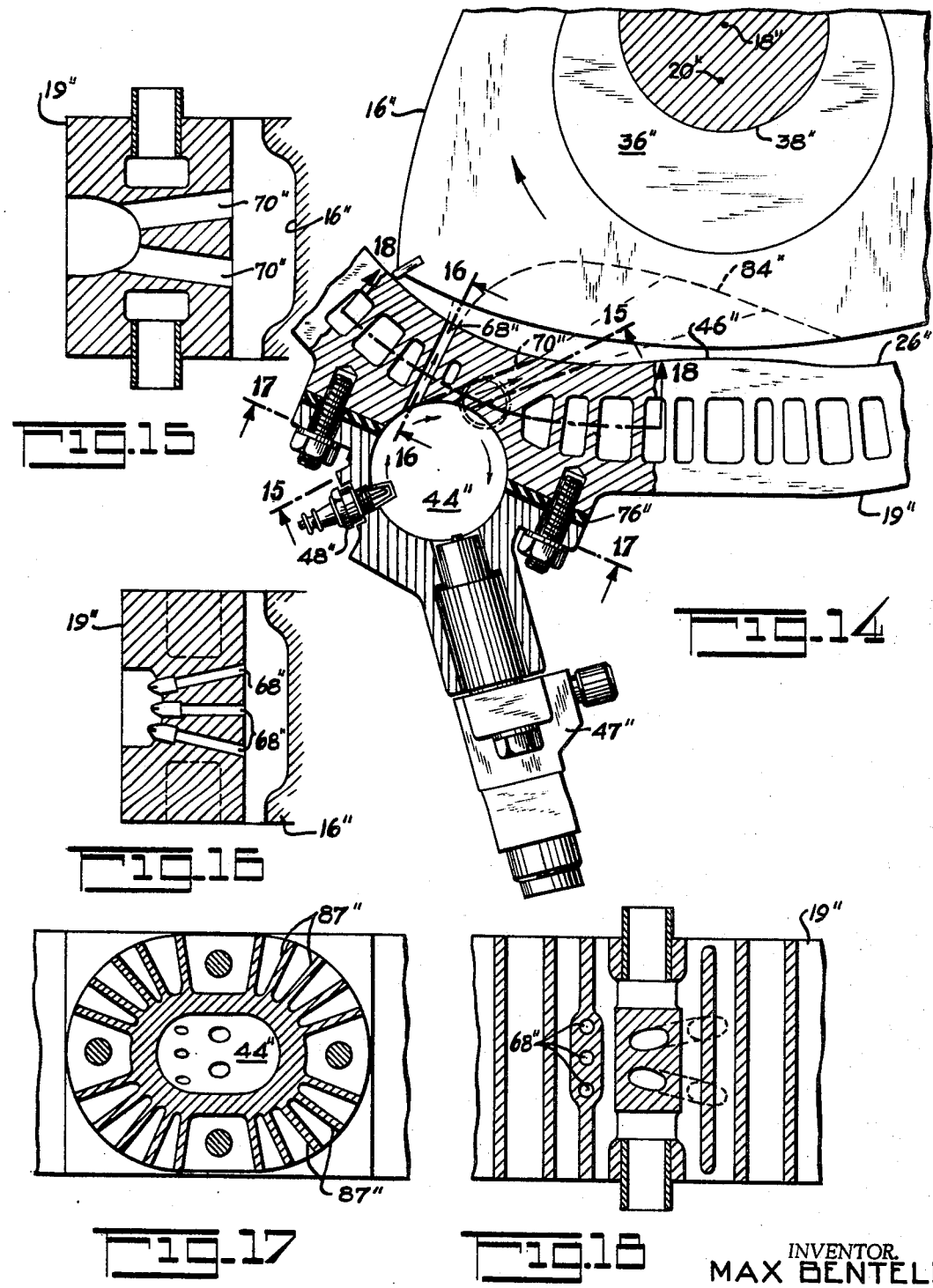

United States Patent Office 3,387,595
Patented June 11, 1968

3,387,595
ROTARY COMBUSTION ENGINE WITH
PRECOMBUSTION CHAMBER
Max Bentele, Ridgewood, N.J., assignor to Curtiss-Wright
Corporation, a corporation of Delaware
Filed May 1, 1962, Ser. No. 191,523
15 Claims. (Cl. 123—8)

The invention relates to rotary combustion engines of the type shown, for example, in Patent No. 2,988,065 issued June 13, 1961, and is particularly directed to a rotating combustion engine having the capability of operating efficiently on a variety of fuels over a wide speed range.

Rotating combustion engines of the type shown in the aforementioned patent have axially-spaced end walls interconnected by a peripheral wall to form a cavity therebetween, and an inner body or rotor received within said cavity between the cavity end walls. The inner surface of said peripheral wall preferably is parallel to the axis of said cavity and, as viewed in a plane transverse to said axis, said inner surface has a multi-lobed profile which preferably is an epitrochoid. The axis of said rotor is parallel to but spaced from the axis of the outer body cavity and said rotor has axially-spaced end faces disposed adjacent to said outer body end walls and also has a plurality of circumferentially-spaced apex portions. The rotor is rotatable relative to the outer body such that said apex portions continuously engage the inner surface of said peripheral wall to form a plurality of working chambers between said rotor and peripheral wall which vary in volume during engine operation. For efficient operation of the engine, its working chambers are sealed and an effective seal is therefore provided between each rotor apex portion and the inner surface of the peripheral wall of the outer body as well as between the end surfaces of the inner rotor and the end walls of the outer body.

Such engines include an intake port, an exhaust port and fuel ignition means. In Otto engines, fuel is admitted as part of a combustible mixture of fuel and air through the intake port, whereas in diesels fuel is admitted through a fuel injection nozzle and only air is admitted through the intake port. The working chambers of the engine have a cycle of operation which includes the four phases of intake, compression, expansion and exhaust. As described in the aforementioned patent this cycle of operation is achieved as a result of the relative rotation of said inner rotor and outer body and for this purpose both said inner rotor and outer body may rotate or one, preferably the inner rotor, may rotate while the outer body is stationary.

The engine of the invention is provided with a precombustion chamber which connects through passages in the peripheral wall with each of the working chambers in succession as the inner body rotates. Fuel is injected into the precombustion chamber during compression within the connecting working chamber, and immediately ignited within the precombustion chamber by suitable ignition means. A jet of burning and unburned fuel is expelled from the precombustion chamber into the working chamber where combustion of the unburned fuel with air moved into the region of the jet by the rotor takes place. In accordance with the invention, passages which connect the precombustion chamber with the working chambers are arranged to expel the jet from the precombustion chamber in either a downstream or upstream direction relative to the direction of rotation of the rotor depending upon the location of the precombustion chamber. In general, the precombustion chamber is so located, the engine is so constructed, and injection is so timed that fuel is burned at a rate and during a period of time most effective for the performance and efficiency of the engine.

Controlled burning of the fuel in a rotary combustion engine whereby the engine is rendered capable of operating on a wide variety of fuels, whether of high, intermediate or low octane or cetane rating is the prime object of the invention.

Also, it is an object of the invention to provide a rotary combustion engine which will operate effectively on low ignition quality fuels at lower compression ratios, such as 6 to 12, than diesel rotary combustion engines. It is well known that rotary combustion engines take on certain undesirable characteristics when designed for high-compression ratios. For example, the engines become bulkier and heavier for the same displacement; engine speed is lowered for the same apex velocity of the rotor and output decreases correspondingly for an equivalent brake means effective pressure; eccentricity decreases and this adversely affects the design of the shaft and bearings; and changed trochoid and rotor geometries lead to a combustion chamber shape which is unfavorable to effective combustion. Furthermore, inherent difficulties are encountered, especially with low ignition quality fuels, when starting; at low speeds and in the low load range in high compression rotating combustion engines operating on the diesel principle. The avoidance of such disadvantages in an engine capable of burning a variety of fuels is a significant advantage of the invention.

Another object of the invention is to provide a rotary combustion engine which will perform satisfactorily without extraneous devices such as preheaters for raising the temperature of the fuel or air or both.

Another object of the invention is to provide a rotary combustion engine in which delayed combustion effects on performance, fuel economy and exhaust smoke are avoided.

Still another object of the invention is to provide a rotary combustion engine in which high air utilization with low combustion pressures in the working chambers, as compared to such pressures in diesels, is achieved at high speeds.

Another object of the invention is to provide a rotary combustion engine wherein the combustion of injected fuel is initiated in a precombustion chamber where particularly favorable conditions for combustion exist due to thorough mixing of the fuel and air, and high temperatures attained within the precombustion space.

Another object of the invention is to provide a rotary combustion engine wherein peak combustion pressures occur in a precombustion chamber rather than in the working chambers of the engine such that bearing loads in the engine are reduced and the likelihood or leakage across the seals for the working chambers is lessened.

Another object of the invention is to provide a rotary combustion engine wherein high velocity jets of flame and fuel from a precombustion chamber penetrate the air in a working chamber during combustion.

Still another object of the invention is to provide a rotary combustion engine wherein the speed range of the engine is extended over more conventional rotary engines by the operation of a precombustion chamber as described in foregoing objects.

Other objects and advantages of the engine of the invention will become apparent during a reading of the specification taken in connection with the accompanying drawings in which:

FIG. 3 is an enlarged transverse sectional view showing a portion of the engine peripheral wall and attached precombustion chamber;

FIG. 4 is a view taken on the line 4—4 of FIG. 3;

FIG. 5 is a sectional view taken on the line 5—5 of FIG. 3;

FIG. 6 is a sectional view on the line 6—6 of FIG. 3;

FIG. 7 is a diagrammatic view and graph showing the magnitude of the pressure differential which exists across an apex seal at different locations on the inner peripheral wall of the outer body of the engine;

FIGS. 8 and 9 are diagrammatic views showing the relative positions of the rotor and precombustion chamber at the beginning and end of fuel injection respectively;

FIGS. 10 and 11 are diagrammatic views of an alternate construction showing the relative positions of the rotor and a precombustion chamber at the beginning and end of fuel injection respectively;

FIG. 12 is a graph showing the manner in which the rate at which fuel is injected into the engine is varied in accordance with rotor position;

FIG. 13 is a diagrammatic view of a pump used to control the injection of fuel into the engine;

FIG. 14 is a view similar to FIG. 3 showing a modified form of precombustion chamber;

FIG. 15 is a sectional view taken on the line 15—15 of FIG. 14;

FIG. 16 is a sectional view taken on the line 16—16 of FIG. 14;

FIG. 17 is a sectional view taken on the line 17—17 of FIG. 14;

FIG. 18 is a sectional view taken on the line 18—18 of FIG. 14.

Figure 1:
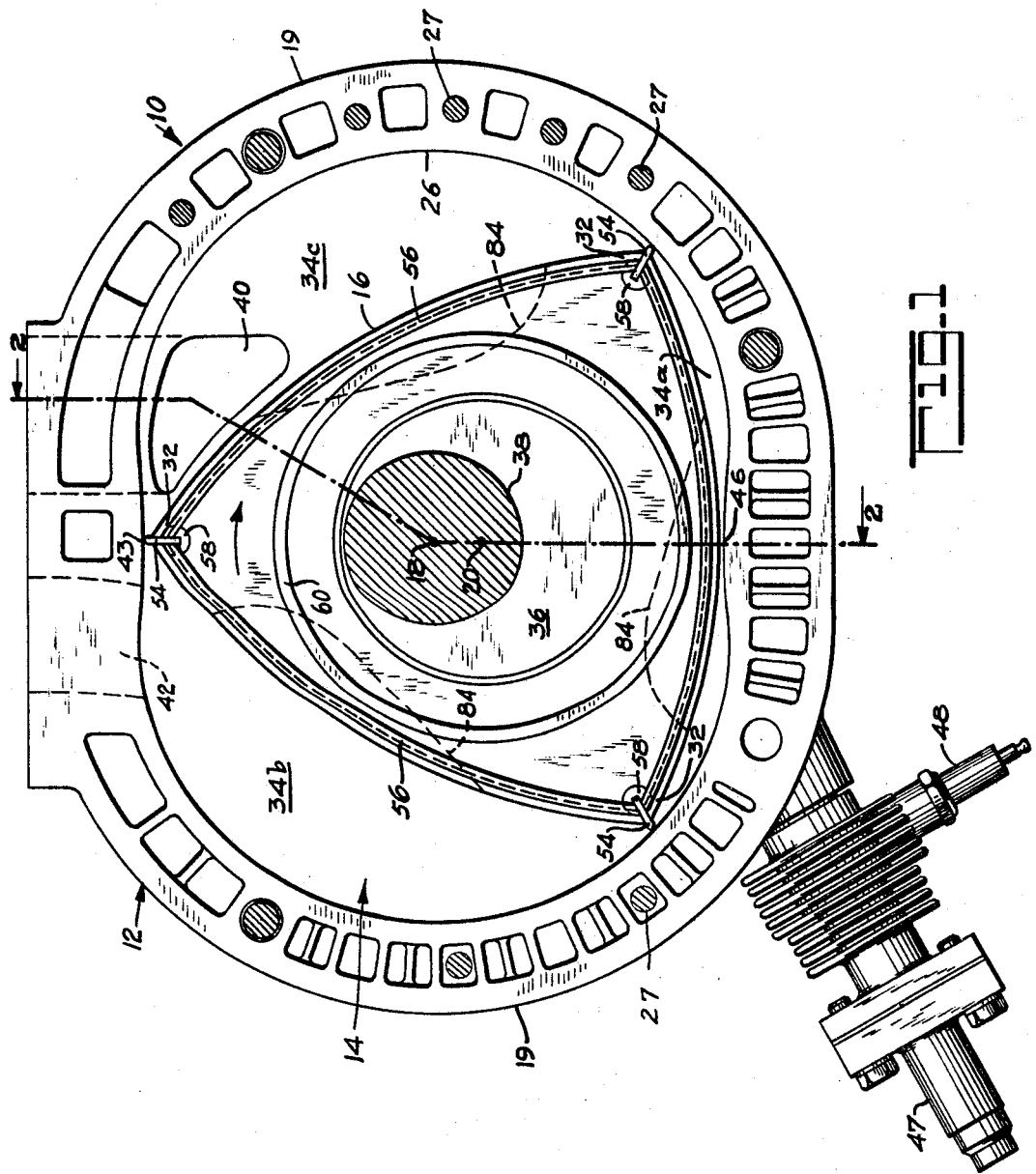
FIG. 1 is a transverse sectional view taken along the line 1—1 of FIG. 2 of a rotary combustion engine embodying the invention.
Figure 2:
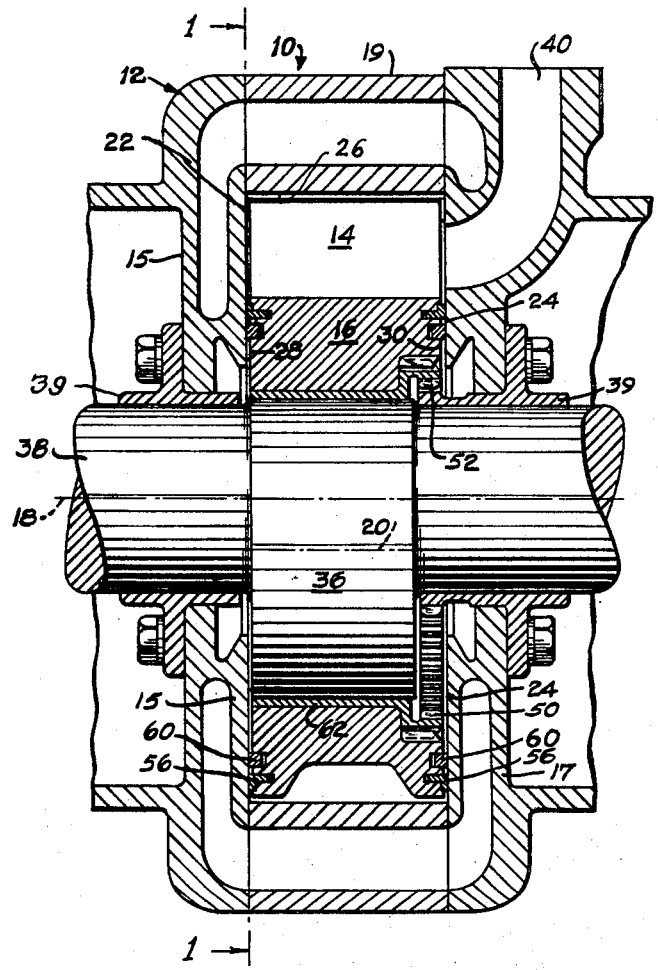
FIG. 2 is a sectional view taken along the broken line 2—2 of FIG. 1.

Referring first to FIGS. 1 and 2 of the drawing, a rotary internal combustion engine according to the invention is indicated by reference numeral 10. The engine 10 comprises an outer body 12 having a caivty 14 within which an inner body 16 is received, said bodies being relatively rotatable and having laterally-spaced parallel axes 18 and 20 respectively. The outer body 12 comprises end housings 15 and 17 with axially-spaced end walls 22 and 24 respectively, and rotor housing 19 with peripheral wall 26 which interconnects the end walls to form said cavity 14. The end housings 15 and 17 are secured to rotor housing 19 as by bolts 27. In a plane normal to its axis 18, the cavity 14 has a multi-lobed profile which preferably is an epitrochoid. In the specific embodiment illustrated the outer body cavity has two lobes, however the outer body cavity may have any number of lobes.

The inner body 16 has axially-spaced end faces 28 and 30 disposed adjacent to said outer body end walls and an outer surface with a plurality of circumferentially-spaced apex portions 32, said apex portions preferably being one more in number than the number of said outer body lobes. Thus, as illustrated, the inner body has three apex portions 32. The inner body apex portions 32 are in continuous engagement with the multi-lobed inner surface of the outer body to form a plurality (three in the embodiment illustrated) or working chambers 34a, 34b and 34c between said two bodies which vary in volume upon relative rotation of the inner and outer bodies during engine operation. Between its apex portions the profile of outer surface of the inner body is such as to operate in an interference free manner relative to the outer body. Thus, as illustrated, the outer surface of the inner body has a triangular profile with outwardly arched sides.

In the embodiment illustrated, the outer body 12 is stationary while the inner body is journaled on an eccentric portion 36 of a shaft 38. The shaft 38 is supported by bearings 39 carried by the outer body 12 and said shaft is co-axial with the geometrical axis 18 of the outer body 12 while the shaft eccentric portions 36 is co-axial with the inner body 12 which, as stated, is journaled on said eccentric portion. During engine operation the inner body 16 has a planetary motion (clockwise in FIG. 1) about the axis 18 of the outer body whereupon the working chambers 34a, 34b and 34c vary in volume such that in each rotation of the inner body about the axis 18 of the outer body each chamber has two positions of minimum volume and two positions of maximum volume.

An intake passage 40 is provided in the outer body end housing 17 for admitting air to the working chambers 34a, 34b and 34c successively, and an exhaust passage 42 is provided in the rotor housing 19 for exhausting combustion gases from said chambers, said passages being disposed on opposite sides of a junction 43 of the lobes of the outer body cavity with the exhaust port being on the upstream side of said junction relative to the direction of rotation of the inner rotor. In accordance with the invention, the engine is provided with a precombustion chamber 44 (FIG. 3) on the side of peripheral wall 26 opposite to the intake and exhaust passages and adjacent to the lobe junction 46. Fuel is injected into precombustion chamber 44 by a nozzle 47, and a spark plug 48 is provided for igniting the fuel when injection is initiated. As is apparent from the drawing the lobe junctions 43 and 46 are points of minimum radius on the multi-lobed profile of the inner surface of the peripheral wall 26. A minimum volume position of each working chamber 34a, 34b and 34c in the region of the lobe junction 46 (lower chamber position in FIG. 1) defines a top dead center position for the inner body. The inner body, therefore, passes through three dead center positions during each rotation.

During engine operation each of the working chambers have a cycle of operation including the four phases of intake, compression, expansion and exhaust. In order to facilitate the relative motion of the inner body relative to the outer body, an internal gear 50 is, as illustrated, secured to the inner body and disposed co-axially with the axis 20 of said inner body. The internal gear 50 is disposed in mesh with a fixed gear 52 secured to the outer body, said fixed gear being co-axial with the shaft 38. Although, as illustrated and described, the outer body 12 is stationary and the inner body 16 has a planetary motion about the axis 18 of the outer body, it will be apparent that either body may be stationary while the other rotates or both said bodies may rotate in the same direction about their own axes.

For efficient operation the working chambers 34 are sealed between the apex portions 32 of the inner body 16 and the peripheral wall 26 of the outer body 12 as well as between the inner body end surfaces and the outer body end walls 22 and 24. As illustrated, this sealing means includes apex seal strip means 54 carried by the inner body 16 and extending along each apex portion 32 of said inner body for sealing engagement with the inner surface of the peripheral wall 26 of the outer body 12 and end face sealing elements 56 carried by each end face extending from one apex portion to the adjacent apex portion of the inner body for sealing engagement with the adjacent end wall of the outer body 12. In addition, intermediate sealing members 58 are provided at each end of each apex portion of the inner body 16 for sealing co-operation between adjacent ends of the seal means 54 and seal elements 56. An oil seal 60 is provided at each end face of the inner body 16 adjacent to the bearing 62 between said inner body and the shaft eccentric 36.

As the engine operates, the various phases of the cycle in the working chambers take place adjacent to the same portion of the outer body 12. Thus, for each working chamber combustion is initiated by the fuel injection nozzle 47 and spark plug 48 in the precombustion chamber 44 which, as already mentioned, is located adjacent the lobe junction 46. Likewise the engine port 40 and exhaust port 42 serve each of the working chambers 34a, 34b and 34c, such chambers being successively connected thereto.

The precombustion chamber 44 is located with regard for the manner in which the pressure differential across an apex seal varies as the seal approaches and moves beyond lobe junction 46. The manner in which the pressure differential ΔP varies in magnitude in the region of lobe junction 46 according to the instantaneous position of the seal for full load operation of the engine is shown by line 66 in FIG. 7. Pressure is greater in chamber 34a, 34b or 34c on the downstream side of an apex seal than in the adjacent chamber on the upstream side for any position of the seal upstream from B, that is, the pressure differential acts generally to the right as viewed in the drawing. With inner body 16 in the position of FIG. 7, for example, pressure is greater in chamber 34a on the downstream side of seal 54a than in chamber 34c on the upstream side of the seal. As an apex seal moves toward location B the pressure differential diminishes until at B pressure on both sides of the seal is the same. As the seal moves beyond B, pressure in the chamber on the upstream side of the seal becomes increasingly greater than pressure on the downstream side of the seal so that the pressure differential acts to the left on the seal. Referring again by way of example to the location in which the inner body is shown in FIG. 7, pressure on the upstream side of seal 54b in chamber 34a is greater than pressure on the downstream side of the seal in chamber 34b. For reasons explained hereinafter, the precombustion chamber 44 is preferably located with passages 68 and 70, which connect the precombustion chamber with cavity 14, slightly downstream from the zero differential pressure location.

As shown, the precombustion chamber 44 has a cylindrical shape and is formed in structure 71 which is received at one end in a recess 72 in the rotor housing (FIGS. 3–6). Structure 71 attaches to the rotor housing as by bolts 74. Preferably, insulating material 76 is provided to thermally isolate the precombustion chamber from the rotor housing and thereby prevent warping of the housing due to the high temperatures which are generated in the precombustion chamber. Nozzle 47 attaches to structure 64 as by bolts 78 and spark plug 48 is screwed into the wall 80 of structure 64. The wall 80 is provided with fins 82 which promote cooling of structure 64 and prevent damage to the metal due to the high temperatures generated in the precombustion chamber.

Passages 68 and passages 70 which connect the precombustion chamber 44 with chambers 34a, 34b and 34c successively during operation of the engine extend from the precombustion chamber in directions substantially normal to the peripheral wall 26 and downstream from the normal respectively as viewed in a plane perpendicular to the axes of the inner and outer bodies. During the compression of air in each of chambers 34a, 34b and 34c and prior to the injection of fuel by nozzle 47 air flows into the precombustion chamber through the two sets of passages 68 and 70 with the greatest portion entering through the larger-sized passages 70.

Fuel injection is initiated in the precombustion chamber prior to each top dead center position of the inner body and is continued for a period of time after top dead center. The initially injected fuel is substantially immediately ignited by spark plug 48, and combustion proceeds in the combustion chamber with a portion of the fuel injected being consumed therein. As injection and combustion proceed in the precombustion chamber, jets of flame and unburned fuel are expelled from passages 68 and 70 into the connecting working chamber 34a, 34b or 34c where combustion of the unburned fuel takes place. Conditions within the precombustion chamber are very favorable to combustion, the high temperatures to which the wall of the precombustion chamber is raised, the rich fuel mixture therein and a thorough mixing of air and fuel in the precombustion chamber all tending to promote effective combustion. Orderly burning of the unburned fuel which is expelled from passages 68 and 70 takes place in the connecting chamber 34a, 34b or 34c as air is moved by the inner body into the region of ejection from said passages.

With an engine having a peripheral wall with the form of a two-lobed epitrochoid as shown in the drawings and wherein the ratio of the angular velocity of shaft 38 to the angular velocity of inner body 16, is 3 to 1, injection may, for example, be initiated at 40° as measured on shaft 38 before top dead center position of the inner body (FIG. 8) and fuel injection terminated at 30° after top dead center (FIG. 9). Combustion continues after the termination of injection until the fuel has been consumed. When the inner body 16 is at the 40° before top dead center position only a very small amount of air has been moved past the passages 68 and 70, and at the 30° after top dead center position jets of flame and fuel are injected from passages 70 into the air not yet moved by the inner body to the passages extending from the precombustion chamber. There is, therefore, effective utilization of air in the engine. Also, delayed combustion with its attendant detrimental effects is avoided. The inner body is formed with trough-like recesses 84 each of which forms a leading portion of a working chamber. Such a non-symmetrical recess, as compared to a recess of the same volume which is symmetrical with respect to its working chamber provides a significantly greater mass of air for combustion near top dead center, and the amount of air at the end of the combustion is reduced. The recesses should be such as to supply air to the region into which the jets of flame and fuel from passages 68 and 70 are injected as required to support the main portion of combustion shortly after top dead center when most effective for the performance and efficiency of the engine.

After the termination of injection and as the upstream apex seal of the working chamber connected with the precombustion chamber moves toward passages 70, pressure within the precombustion chamber decreases and the gases therein exhaust in large measure into the connected working chamber. When such seal moves beyond passages 70 into a position between passages 68 and 70 residual gases in the precombustion chamber are scavenged by fresh air which flows from the chamber on the upstream side of the seal through passages 70 into the precombustion chamber and out of the passages 68 into the chamber on the downstream side of the seal, the downstream chamber being connected to the exhaust port of the engine. Inasmuch as the precombustion chamber is scavenged with fresh air into an exhaust connected chamber, no detrimental effects on volumetric efficiency results.

As stated, advantages of having the precombustion chamber with its passages downstream from the zero differential pressure location are that very little air is lost to combustion prior to the initiation of injection and the precombustion chamber is scavenged into an exhaust connected chamber such that no loss in volumetric efficiency results. A disadvantage of this location is that the precombustion chamber is at a location where the rotor housing is subjected to high temperatures and operation of the precombustion chamber tends to further raise such temperatures. This disadvantage can be avoided by locating the precombustion chamber with its passages upstream from lobe junction 46. Also, when the precombustion chamber and its passages are located upstream combustion as a whole can be earlier than when they are at the downstream location of FIGS. 8 and 9.

Reference is now made to FIGS. 10 and 11 in which the precombustion chamber and passages therefrom are shown at the upstream location. As shown in FIGS. 10 and 11 wherein parts corresponding to parts in FIGS. 1–9 are designated by the same reference character but with a prime mark (′) added thereto, the precombustion chamber 44′ is located upstream from lobe junction 46′.

With the precombustion chamber in this alternate position more air is moved past the precombustion chamber prior to the beginning of injection at 40° before top dead center than when the precombustion chamber is on the downstream side of lobe junction 46'. However, passages 70' from the upstream precombustion chamber are inclined so as to direct the jets of flame and fuel which issue therefrom into the air which has passed and thereby minimize the loss of air to combustion. Practically no air is lost to combustion due to the termination of injection at 40° after top dead center. When the precombustion chamber is located upstream from the lobe junction 46' as in FIGS. 10 and 11 the inner body 16' is formed with recesses 84' each of which forms a trailing portion of a working chamber. A substantially greater mass of air is provided for combustion near top dead center with such a recess than would be provided with a recess which is symmetric or leading with respect to its working chamber. In addition the amount of air moved past the passages 68' and 70' prior to the beginning of injection is reduced. The recesses 84' should be such as to supply air so as to support the main portion of combustion shortly after top dead center.

After injection is terminated and as the trailing apex seal of the chamber which connects with precombustion chamber 44', approaches passages 68', pressure within the precombustion chamber becomes less with gases in the precombustion chamber exhausting in large measure into the connected working chamber. When the apex seal moves to a location between 68' and 70' precombustion chamber 44' is scavenged by exhaust gases. Such gases flow from the chamber on the downstream side of the seal through passages 70' into the precombustion chamber and flow out of the precombustion chamber through passages 68' into the upstream chamber which connects with the engine intake port. Some loss in volumetric efficiency results.

A total amount of fuel is injected for full load operation during each fuel injection period, such as to provide substantially the proper stoichiometric mixture with the air which is transferred by rotation of the inner body into the region of burning during combustion. The rate at which the fuel is injected is varied, the fuel injection rate being scheduled to provide favorable combustion conditions commensurate with the mass transfer past the precombustion chamber and the instantaneous heat release which produce the best indicated horsepower. A typical curve indicating the character of the injection is shown in FIG. 12. The engine is operated at less than full load by terminating injection sooner than otherwise. Although the timing of the beginning of injection is essentially constant, preferably means are provided for slightly adjusting such timing according to speed.

A fuel injection pump 90 (FIG. 13), which is of a conventional type commonly used in fuel metering systems, is provided for delivering fuel to the nozzle of the engine at the desired rate. Fuel is supplied through pump inlet 92 and delivered through outlet 94 in accordance with the stroke of plunger 96 which is actuated by a cam 98 driven from the engine shaft. Having due regard for the characteristics of the fuel injection system, the cam profile is designed to provide the desired rate of fuel injection as shown in FIG. 12. The plunger 96 can be positioned at different angles by a control rack 99, and pump timing thereby adjusted as may be desired for different engine r.p.m.'s. At a given angle of the plunger, inlet port 100 is closed when the top of the plunger covers it. From this point as the plunger rises fuel is forced through check valve 102 into outlet 94. Delivery continues until helical groove 104 in the plunger uncovers the inlet port 100 at which point pressure in the cylinder 106 drops to the inlet pressure and flow through the check valve 102 ceases.

FIGS. 15–18 show a modified form of precombustion chamber. In FIGS. 15–18 parts which correspond to parts shown in the figures already referred to are designated by the same reference character but with a double prime mark (″) added thereto. The modified combustion chamber 44″ is circular in form as viewed in a transverse plane perpendicular to the axes of the inner and outer bodies and appears oval shaped in a plane perpendicular to the transverse plane. As shown, the passages 68″ and 70″ which connect the precombustion chamber with the outer body cavity 14″ extend almost tangentially from the precombustion chamber. Because of the inclination of the passages 68″ and 70″ air entering the precombustion chamber through said passages is caused to swirl within the precombustion chamber in a counterclockwise direction. The swirl thoroughly mixes initially injected fuel from nozzle 47″ with the air. Injected fuel is ignited by spark plug 48″ and as combustion proceeds jets of flame and unburned fuel are expelled from the passages 68″ and 70″. The swirl within the precombustion chamber thereupon reverses in direction, that is, the swirl acts in a clockwise direction as shown and becomes effective to increase the intensity of the jets of flame and unburned fuel. In order to further increase the velocity at which fuel is expelled from the precombustion chamber the nozzle 47″ might be located in line with passages 70″ instead of in the position shown. As with the cylindrical precombustion chamber previously described, insulating material 76″ is preferably provided to thermally isolate the precombustion chamber from the rotor housing. Also, fins 87″ are formed on structure 64″ to promote cooling thereof and prevent damage to the metal due to the high temperatures generated in the precombustion chamber.

Although the precombustion chamber in the engine of the invention preferably connects with the outer body cavity of the engine as described hereinbefore and as shown in the drawings, through two sets of passages spaced to provide for scavenging of the precombustion chamber when an apex seal is between the two sets of passages, the engine will also function satisfactorily with only one set of connecting passages lying in a common plane parallel to the axes of the inner and outer bodies. As has been noted the gases within the precombustion chamber are in large measure exhausted by expansion of the connected working chamber after termination of injection. Preferably a single set of passages would be inclined to spray fuel upstream or downstream depending upon the location of the precombustion chamber, that is, upstream in the case of a precombustion chamber located downstream from the zero pressure differential location and downstream in the case of a precombustion chamber located upstream from the lobe junction adjacent said zero pressure differential location.

Although several embodiments of the invention have been shown and described, it will be apparent to those skilled in the art that various changes and modifications may be made in the structures illustrated and described without departing from the spirit and scope of the invention. I aim to cover all such modifications and changes in the appended claims.

What is claimed is:

1. A rotary internal combustion engine having a cycle including the four strokes of intake, compression, expansion and exhaust and comprising an outer hollow body and an inner body supported for relative turning movement within the outer body, and turning on an axis eccentric of and parallel to the axis of the outer body, said bodies having respective facing surfaces defining a plurality of variable volume working chambers, said facing surfaces comprising the outer surface of the inner body and the inner surface of the outer body which includes a plurality of arched lobe-defining portions spaced circumferentially on the axis of the outer body, said outer surface of the inner body including a plurality of apex portions spaced circumferentially about the axis of the inner body, said apex portions including seals which extend parallel to the axis of the inner body and engage the inner surface of the outer body, intake passage means arranged to communicate with the space between the exterior of the inner body and interior of the outer body for successively feeding all said chambers as the bodies relatively move, exhaust passage means also arranged to communicate with said space, means forming a precombustion chamber, a nozzle connected to said means for injecting fuel into said precombustion chamber, and means in said precombustion chamber for igniting the fuel, said outer body including passage means adjacent a lobe junction for connecting the precombustion chamber with each of the working chambers after intake and before exhaust while working chamber volume is relatively small, the passage means being disposed to one side of a location along the inner surface of the outer body where pressure on both sides of an apex seal is the same and including separate passages spaced apart at the inner surface of the outer body in the direction of motion of the inner body for connecting adjacent working chambers through the precombustion chamber when an apex seal is between the spaced passages.

2. A rotary combustion engine as defined in claim 1 with the passage means downstream from the adjacent lobe junction relative to the direction of rotation of the inner body.

3. A rotary combustion engine as defined in claim 2 wherein the inner body is provided with a plurality of recesses corresponding in number to the number of working chambers and each recess forms a leading portion of a working chamber.

4. A rotary combustion engine as defined in claim 1 with the passage means located upstream from the adjacent lobe junction relative to the direction of rotation of the inner body.

5. A rotary combustion engine as defined in claim 4 wherein the inner body is provided wtih a plurality of recesses corresponding in number to the number of working chambers and each recess forms a trailing portion of a working chamber.

6. A rotary combustion engine as defined in claim 1 wherein the precombustion chamber is cylindrical in form.

7. A rotary combustion engine as defined in claim 1 wherein the precombustion chamber is circular in form in a plane perpendicular to the axes of the inner and outer bodies and the passage means extends in direction with respect to the periphery of the precombustion chamber for promoting a swirl within the chamber.

8. A rotary combustion engine as defined in claim 7 wherein the passage means is substantially tangent to the precombustion chamber periphery in the plane perpendicular to the axes of the inner and outer bodies.

9. A rotary internal combustion engine having a cycle including the four strokes of intake, compression, expansion and exhaust and comprising an outer hollow body and an inner body supported for relative turning movement within the outer body, and turning on an axis eccentric of and parallel to the axis of the outer body, said bodies having respective facing surfaces defining a plurality of variable volume working chambers, said facing surfaces comprising the outer surface of the inner body and the inner surface of the outer body which includes a plurality of arched lobe-defining portions spaced circumferentially on the axis of the outer body, said outer surface of the inner body including a plurality of apex portions spaced circumferentially about the axis of the inner body, said apex portions including seals which extend parallel to the axis of the inner body and engage the inner surface of the outer body, intake passage means arranged to communicate with the space between the exterior of the inner body and interior of the outer body for successively feeding all said chambers as the bodies relatively move, exhaust passage means also arranged to communicate with said space, means forming a precombustion chamber, a nozzle connected to said means for injecting fuel into said precombustion chamber, and means in said precombustion chamber for igniting the fuel, said outer body including passage means adjacent a lobe junction for connecting the precombustion chamber with each of the working chambers after intake and before exhaust while working chamber volume is relatively small, the passage means being disposed to one side of a location along the inner surface of the outer body where pressure on both sides of an apex seal is the same and including two sets of passages, the sets being spaced apart at the inner surface of the outer body in the direction of motion of the inner body whereby adjacent working chambers are connected through the precombustion chamber when an apex seal is between the sets of passages.

10. A rotary combustion engine as defined in claim 9 wherein one of the sets of passages is disposed at an angle in the outer body whereby fuel and flame from said combustion chamber is ejected from the one set generally toward the adjacent lobe junction.

11. A rotary combustion engine as defined in claim 10 with the passage means downstream from the location along the inner surface of the outer body where pressure is the same on both sides of an apex seal and with the said one set of passages upstream from the other set.

12. A rotary combustion engine as defined in claim 11 wherein the inner body is provided with a plurality of recesses corresponding in number to the number of working chambers and each forms a leading portion of a working chamber.

13. A rotary combustion engine as defined in claim 10 with the passage means upstream from the location along the inner surface of the outer body where pressure is the same on both sides of an apex seal and with said one set of passages downstream from the other set.

14. A rotary combustion engine as defined in claim 13 wherein the inner body is provided with a plurality of recesses corresponding in number to the number of working chambers and each forms a trailing portion of a working chamber.

15. A fuel injection rotary piston internal combustion engine of the type in which fuel and air are intermixed within the engine proper, which comprises: a first engine member forming an outer engine body with a main chamber having an air inlet for drawing in air and an exhaust gas outlet for discharging exhaust gas, and a second engine member arranged within said main chamber and rotatable relative to said first engine member, said first and second engine members confining with each other a plurality of continuously varying chamber means including a compression and combustion chamber means, said second engine member being operable to convey air drawn in through said inlet to said compression and combustion chamber means while forming the compression and combustion chamber means with said first engine member, one of said engine members being provided with sealing edges extending parallel to the axis of rotation of said second engine member and sealingly engaging respective adjacent surface portions of the other engine member for sealing all of said chamber means relative to each other, said first engine member being provided with auxiliary chamber means and with passage means leading from said auxiliary chamber means into said chamber means which are confined by said first and second engine members for permitting an exchange of a turbulent fuel air mixture between said auxiliary chamber means and said compression and combustion chamber means, fuel injection nozzle means leading into at least one of said two last-mentioned chamber means for injecting fuel thereinto, the entrance of said passage means into said chamber means confined by said first and second engine members being so located with regard to said sealing edges that the respective sealing edge adjacent said entrance will in the direction of rotation of said second engine member pass by said entrance and permit communication between said passage means and said compression and combustion chamber means only shortly before the end of the desired compression of air in said compression and combustion chamber means, whereby a turbulent flow of compressed air into and through said auxiliary chamber means will be created.

References Cited

UNITED STATES PATENTS

| | | | |
|---|---|---|---|
| 3,053,238 | 9/1962 | Meurer | 123—8 |
| 2,927,560 | 3/1960 | Breelle | 123—8 |

FOREIGN PATENTS

| | | |
|---|---|---|
| 1,260,221 | 3/1961 | France. |
| 1,254,162 | 1/1961 | France. |

RALPH D. BLAKESLEE, *Primary Examiner.*

KARL ALBRECHT, *Examiner.*

F. T. SADLER, *Assistant Examiner.*